United States Patent
Yeskel et al.

(10) Patent No.: US 9,391,792 B2
(45) Date of Patent: Jul. 12, 2016

(54) SYSTEM AND METHOD FOR EVENT CONTENT STREAM

(75) Inventors: Zachary Yeskel, San Francisco, CA (US); Anton Lopyrev, San Francisco, CA (US); Tianxuan Chen, San Francisco, CA (US); Dave Cohen, Mountain View, CA (US); Kavi Harshawat, San Francisco, CA (US); Matthew Steiner, Mountain View, CA (US); James Gallagher, Sunnyvale, CA (US); Denise Ho, Los Altos, CA (US); Ajmal Asver, San Francisco, CA (US)

(73) Assignee: Google Inc., Mountain View, CA (US)

( * ) Notice: Subject to any disclaimer, the term of this patent is extended or adjusted under 35 U.S.C. 154(b) by 252 days.

(21) Appl. No.: 13/534,555

(22) Filed: Jun. 27, 2012

(65) Prior Publication Data
US 2014/0006515 A1  Jan. 2, 2014

(51) Int. Cl.
  *G06F 15/16* (2006.01)
  *H04L 12/18* (2006.01)

(52) U.S. Cl.
  CPC .................... *H04L 12/1895* (2013.01)

(58) Field of Classification Search
  USPC ............... 709/204–205, 206, 217, 203, 200; 725/40–45
  See application file for complete search history.

(56) References Cited

U.S. PATENT DOCUMENTS

| | | | |
|---|---|---|---|
| 6,421,358 B1 | 7/2002 | Stimmel et al. | |
| 6,513,014 B1 | 1/2003 | Walker et al. | |
| 6,557,041 B2 | 4/2003 | Mallart | |
| 6,940,998 B2 * | 9/2005 | Garoutte | 382/103 |
| 6,947,976 B1 | 9/2005 | Devitt et al. | |
| 7,298,960 B1 | 11/2007 | Taylor | |
| 7,489,946 B2 | 2/2009 | Srinivasan et al. | |
| 7,512,829 B2 | 3/2009 | Mital et al. | |
| 7,539,747 B2 | 5/2009 | Lucovsky et al. | |
| 7,552,068 B1 | 6/2009 | Brinkerhoff | |
| 7,620,902 B2 | 11/2009 | Manion et al. | |
| 7,804,426 B2 | 9/2010 | Etcheson | |
| 7,812,998 B2 | 10/2010 | Miers | |
| 7,844,482 B1 | 11/2010 | Larson | |
| 7,849,481 B2 * | 12/2010 | Moon et al. | 725/45 |

(Continued)

FOREIGN PATENT DOCUMENTS

| | | |
|---|---|---|
| JP | 2004-222056 A | 8/2004 |
| JP | 2007-249821 | 9/2007 |

(Continued)

OTHER PUBLICATIONS

International Preliminary Report on Patentability, International Search Report & Written Opinion mailed Dec. 9, 2014 for App. No. PCT/US2013/048318.

(Continued)

*Primary Examiner* — El Hadji Sall

(57) ABSTRACT

A computer-implemented method, computer program product, and computing system for providing a live stream of event content is provided. In an embodiment, a method may include defining an online collaborative space associated with an event. A plurality of event participants may be associated with the event. Content contributions may be received from one or more of the event participants. An event content update may be transmitted to a client event application based on the received content contributions to provide a live stream of event content.

20 Claims, 4 Drawing Sheets

(56) References Cited

U.S. PATENT DOCUMENTS

| | | | |
|---|---|---|---|
| 7,903,904 B1* | 3/2011 | Loeb | G06F 17/30265 382/305 |
| 7,917,859 B1 | 3/2011 | Singh et al. | |
| 8,359,285 B1 | 1/2013 | Dicker et al. | |
| 8,359,540 B2 | 1/2013 | Darling | |
| 8,380,039 B2 | 2/2013 | Luo et al. | |
| 8,412,773 B1 | 4/2013 | Chapweske et al. | |
| 8,630,494 B1 | 1/2014 | Svendsen | |
| 8,730,397 B1 | 5/2014 | Zhang | |
| 8,761,523 B2 | 6/2014 | Cok et al. | |
| 8,914,483 B1 | 12/2014 | Dixon et al. | |
| 2003/0214128 A1 | 11/2003 | Roberts et al. | |
| 2004/0073615 A1 | 4/2004 | Darling | |
| 2005/0010470 A1 | 1/2005 | Marino | |
| 2005/0021822 A1 | 1/2005 | Cherkasova et al. | |
| 2005/0105396 A1 | 5/2005 | Schybergson | |
| 2005/0187943 A1 | 8/2005 | Finke-Anlauff et al. | |
| 2006/0112080 A1 | 5/2006 | Chen et al. | |
| 2006/0125930 A1 | 6/2006 | Mindrum et al. | |
| 2006/0159007 A1 | 7/2006 | Frutiger et al. | |
| 2006/0234769 A1 | 10/2006 | Srinivasan et al. | |
| 2006/0287105 A1 | 12/2006 | Willis | |
| 2007/0022447 A1 | 1/2007 | Arseneau et al. | |
| 2007/0219949 A1 | 9/2007 | Mekikian | |
| 2007/0260361 A1 | 11/2007 | Etcheson | |
| 2007/0266047 A1 | 11/2007 | Cortes et al. | |
| 2008/0005761 A1 | 1/2008 | Repasi et al. | |
| 2008/0086511 A1 | 4/2008 | Takoa | |
| 2008/0114844 A1 | 5/2008 | Sanchez et al. | |
| 2008/0133697 A1 | 6/2008 | Stewart et al. | |
| 2008/0136930 A1 | 6/2008 | Nagai | |
| 2008/0144135 A1 | 6/2008 | Miers | |
| 2008/0184139 A1 | 7/2008 | Stewart et al. | |
| 2008/0189175 A1 | 8/2008 | Chan | |
| 2008/0201299 A1 | 8/2008 | Lehikoinen et al. | |
| 2008/0301736 A1 | 12/2008 | Heilbron et al. | |
| 2009/0019902 A1 | 1/2009 | Baranek | |
| 2009/0171873 A1* | 7/2009 | Dolin et al. | 706/20 |
| 2009/0191902 A1 | 7/2009 | Osbourne | |
| 2009/0248692 A1 | 10/2009 | Tsukagoshi | |
| 2009/0248703 A1 | 10/2009 | Tsukagoshi et al. | |
| 2009/0276531 A1 | 11/2009 | Myka et al. | |
| 2009/0319472 A1 | 12/2009 | Jain et al. | |
| 2010/0088336 A1 | 4/2010 | Johnston et al. | |
| 2010/0124378 A1 | 5/2010 | Das et al. | |
| 2010/0158315 A1 | 6/2010 | Martin | |
| 2010/0169389 A1 | 7/2010 | Weber et al. | |
| 2010/0198880 A1 | 8/2010 | Petersen | |
| 2010/0241945 A1 | 9/2010 | Chen et al. | |
| 2010/0250633 A1 | 9/2010 | Hannuksela et al. | |
| 2010/0262916 A1 | 10/2010 | Jones et al. | |
| 2010/0315664 A1 | 12/2010 | Miers | |
| 2010/0318611 A1 | 12/2010 | Curtin et al. | |
| 2011/0066743 A1 | 3/2011 | Hurley et al. | |
| 2011/0080424 A1 | 4/2011 | Peters et al. | |
| 2011/0099199 A1 | 4/2011 | Stalenhoef et al. | |
| 2011/0137709 A1 | 6/2011 | Meyer et al. | |
| 2011/0138003 A1 | 6/2011 | Yoon et al. | |
| 2011/0161423 A1 | 6/2011 | Pratt et al. | |
| 2011/0167136 A1 | 7/2011 | Naimark et al. | |
| 2011/0211737 A1 | 9/2011 | Krupka et al. | |
| 2011/0214077 A1 | 9/2011 | Singh et al. | |
| 2011/0238631 A1 | 9/2011 | Cortes et al. | |
| 2011/0270923 A1* | 11/2011 | Jones et al. | 709/204 |
| 2011/0276513 A1 | 11/2011 | Erhart et al. | |
| 2011/0295667 A1 | 12/2011 | Butler | |
| 2011/0296536 A1 | 12/2011 | Muller et al. | |
| 2012/0007995 A1 | 1/2012 | Barrett | |
| 2012/0023129 A1 | 1/2012 | Vedula et al. | |
| 2012/0027256 A1 | 2/2012 | Kiyohara | |
| 2012/0030194 A1 | 2/2012 | Jain | |
| 2012/0047147 A1 | 2/2012 | Redstone et al. | |
| 2012/0072428 A1* | 3/2012 | Kao | G06F 17/3089 707/748 |
| 2012/0079396 A1 | 3/2012 | Neer et al. | |
| 2012/0082378 A1 | 4/2012 | Peters et al. | |
| 2012/0092685 A1 | 4/2012 | Barrett | |
| 2012/0100869 A1 | 4/2012 | Liang et al. | |
| 2012/0102409 A1 | 4/2012 | Fan et al. | |
| 2012/0109901 A1 | 5/2012 | Mase | |
| 2012/0114296 A1 | 5/2012 | Luo et al. | |
| 2012/0122554 A1 | 5/2012 | Paquet et al. | |
| 2012/0123867 A1 | 5/2012 | Hannan | |
| 2012/0136689 A1 | 5/2012 | Ickman et al. | |
| 2012/0153016 A1 | 6/2012 | Slaby et al. | |
| 2012/0158871 A1 | 6/2012 | Amano et al. | |
| 2012/0179664 A1 | 7/2012 | Auerbach et al. | |
| 2012/0213404 A1 | 8/2012 | Steiner | |
| 2012/0214568 A1 | 8/2012 | Herrmann | |
| 2012/0220314 A1 | 8/2012 | Altman et al. | |
| 2012/0246003 A1 | 9/2012 | Hart et al. | |
| 2012/0251011 A1 | 10/2012 | Gao et al. | |
| 2012/0278387 A1 | 11/2012 | Garcia et al. | |
| 2013/0006882 A1 | 1/2013 | Galliani | |
| 2013/0101220 A1* | 4/2013 | Bosworth | G06F 17/3079 382/195 |
| 2013/0117365 A1 | 5/2013 | Padmanabhan et al. | |
| 2013/0124311 A1 | 5/2013 | Sivanandan et al. | |
| 2013/0129232 A1 | 5/2013 | Cok et al. | |
| 2013/0141529 A1* | 6/2013 | Sathish | H04N 13/0048 348/43 |
| 2013/0232251 A1 | 9/2013 | Pauley | |
| 2013/0305287 A1 | 11/2013 | Wong et al. | |
| 2015/0005010 A1 | 1/2015 | Zhang et al. | |

FOREIGN PATENT DOCUMENTS

| | | |
|---|---|---|
| JP | 2008-146174 A | 6/2008 |
| JP | 2008-146230 A | 6/2008 |
| JP | 2010-237751 A | 10/2010 |
| JP | 2012-514276 | 6/2012 |
| JP | 2009009204 | 1/2015 |
| KR | 10-2009-0080063 | 7/2009 |
| KR | 10-2010-0120282 | 11/2010 |
| KR | 10-2012-0034600 | 4/2012 |
| WO | 2007113462 A1 | 10/2007 |
| WO | 2007/135871 | 11/2007 |
| WO | 2008/045701 | 4/2008 |
| WO | 2009/076555 | 6/2009 |
| WO | 2009082814 A1 | 7/2009 |
| WO | 2010/108157 | 9/2010 |
| WO | 2011/001587 A1 | 1/2011 |
| WO | 2011001587 A1 | 1/2011 |
| WO | 2011/149961 A2 | 12/2011 |

OTHER PUBLICATIONS

Florian, Alt et al., Location-based Crowdsourcing: Extending Crowdsourcing to the Real World, Oct. 2010, Proceedings NordiCHI Oct. 16-20, 2010 pp. 13-22.
MacPeople Magazine, Aug. 2009, vol. 15, No. 8, Issue 248.
Final Rejection dated Jul. 11, 2014, U.S. Appl. No. 13/658,490, filed Oct. 23, 2012.
International Search Report and Written Opinion for PCT Application No. PCT/US2013/066257 mailed Apr. 25, 2014.
Written Opinion From ISA dated Aug. 18, 2013 for related PCT Application No. PCT/US2012/024874.
Examination Report dated Nov. 25, 2014, for Australian Patent Application No. 2012217920.
Non-Final Rejection dated Mar. 28, 2014, U.S. Appl. No. 13/050,195, filed Mar. 17, 2011.
Notice of Allowance dated Aug. 15, 2014, U.S. Appl. No. 13/050,195, filed Mar. 17, 2011.
Notice of Allowance dated Jan. 24, 2014, U.S. Appl. No. 13/050,195, filed Mar. 17, 2011.
Office Action dated Jan. 29, 2013, U.S. Appl. No. 13/050,195, filed Mar. 17, 2011.
Office Action dated Sep. 10, 2013, U.S. Appl. No. 13/050,195, filed Mar. 17, 2011.
U.S. Appl. No. 13/346,385, filed Jan. 9, 2012.
Non-Final Rejection dated Jul. 15, 2015, U.S. Appl. No. 13/929,498, filed Jun. 27, 2013.

(56) References Cited

OTHER PUBLICATIONS

Korean Notice of Preliminary Rejection received in Korean Patent Application No. 10-2015-7002159 (with Translation), Jan. 26, 2016, 15 pages.
USPTO, Notice of Allowance for U.S. Appl. No. 13/661,425, Dec. 8, 2015, 7 pages.
PCT International Search Report and the Written Opinion of the International Search Authority received in related International Patent Application No. PCT/US2013/066414, Jan. 29, 2014, 8 pages.
USPTO, Final Rejection for U.S. Appl. No. 13/661,425, Mar. 10, 2015, 13 pages.
USPTO, Non-Final Rejection for U.S. Appl. No. 13/542,379, filed Jul. 5, 2012, Nov. 19, 2015, 10 pages.
Japanese Patent Office, Notice of Allowance for Japanese Patent Application No. 2013-554527, Nov. 20, 2015, 6 pages.
USPTO, Notice of Allowance received for U.S. Appl. No. 13/534,555, filed Jun. 27, 2012, Oct. 23, 2015, 5 pages.
USPTO, Non-Final Rejection for U.S. Appl. No. 13/661,425, Sep. 18, 2014, 11 pages.
USPTO, Non-Final Rejection received for U.S. Appl. No. 14/571,213, Sep. 24, 2015, 21 pages.
Australian Patent Office, Patent Examination Report No. 1 for Australian Patent Application No. 2013334606, Nov. 25, 2015, 2 pages.
"Extended European Search Report", EP Application No. 13737075.5, Jan. 13, 2016, 8 Pages.
USPTO, Final Office Action for U.S. Appl. No. 13/346,385, Feb. 5, 2016, 11 pages.
USPTO, Notice of Allowance for U.S. Appl. No. 13/658,490, Feb. 19, 2016, 40 Pages.
"JP Notice of Reasons for Rejection", Japanese Application No. 2015-520534, Mar. 7, 2016, 9 pages.
USPTO, Final Rejection in U.S. Appl. No. 13/929,498, Feb. 25, 2016.
"JPO Notice of Reasons for Rejection", Japanese Application No. 2015-539724, Apr. 4, 2016.
Notice of Allowance for U.S. Appl. No. 13/661,425, Dec. 8, 2015.
PCT. International Search Report and the Written Opinion of the International Search Authority received in related PCT Application No. PCT/US2013/066414, Jan. 29, 2015.
Final Rejection for U.S. Appl. No. 13/661,425, Mar. 10, 2015.
Non-Final Rejection for U.S. Appl. No. 13/542,379, filed Jul. 5, 2012, Nov. 19, 2015.
Notice of Allowance for Japanese Application No. 2013-554527, Nov. 20, 2015.
Notice of Allowance received for U.S. Appl. No. 13/534,555, filed Jun. 27, 2012, Oct. 23, 2015.
Non-Final Rejection for U.S. Appl. No. 13/661,425, Sep. 18, 2014.
Australian Patent Office. Patent Examination Report No. 1 for Australian Patent Application No. 2013334606, 2 pages.
Non-Final Rejection received for U.S. Appl. No. 14/571,213, Sep. 24, 2015.
Atsushi Hayakawa, "Remarkable Software At the Cutting Edge," MacPeople, ASCII Media Works Inc., Aug. 1, 2009, vol. 15, No. 8, p. 176.
Non-Final Rejection—dated Jul. 2, 2015, U.S. Appl. No. 13/658,490, filed Oct. 23, 2012.
Japanese Office Action mailed Aug. 18, 2015 in Japanese Application No. 2013-554527.
Notice of Allowance dated Jun. 11, 2015 for U.S. Appl. No. 13/534,555, filed Jun. 27, 2012.
Non-Final Rejection, dated Jul. 22, 2015 for U.S. Appl. No. 13/346,385, filed Jan. 9, 2012.
Unpublished U.S. Appl. No. 13/346,385, filed Jan. 9, 2012.
Non-Final Rejection, dated Sep. 20, 2013 for U.S. Appl. No. 13/346,385, filed Jan. 9, 2012.
Final Rejection, dated Feb. 14, 2014, for U.S. Appl. No. 13/346,385, filed Jan. 9, 2012.
International Preliminary Report on Patentability dated Aug. 21, 2013 for related PCT Application No. PCT/US2012/024874.
International Search Report dated Aug. 23, 2012 for related PCT Application No. PCT/US2012/024874.
Written Opinion From ISA dated August 18, 2013 for related PCT Application No. PCT/US2012/024874.
Non-Final Rejection, dated Apr. 2, 2013, for U.S. Appl. No. 13/219,835, filed Aug. 29, 2011.
Non-Final Rejection, dated Oct. 24, 2014, for U.S. Appl. No. 13/219,835, filed Aug. 29, 2011.
Final Rejection, dated Oct. 9, 2013, U.S. Appl. No. 13/219,835, filed Aug. 29, 2011.
Notice of Allowance, dated Jan. 24, 2014, U.S. Appl. No. 13/050,195, filed Mar. 17, 2011.
Non-Final Rejection, dated Mar. 28, 2014, U.S. Appl. No. 13/050,195, filed Mar. 17, 2011.
Notice of Allowance, dated Aug. 15, 2014, U.S. Appl. No. 13/050,195, filed Mar. 17, 2011.
Office Action, dated Jan. 29, 2013, U.S. Appl. No. 13/050,195, filed Mar. 17, 2011.
Office Action, dated Sep. 10, 2013, U.S. Appl. No. 13/050,195, filed Mar. 17, 2011.
Examination Report, dated Nov. 25, 2014, for Australian Patent Application No. 2012217920 Office Action, dated Mar. 28, 2014, U.S. Appl. No. 13/050,195, filed Mar. 17, 2011.
International Search Report and Written Opinion for corresponding PCT application No. PCT/US2013/066257 mailed Apr. 25, 2014.
Non-Final Rejection dated Sep. 30, 2014, U.S. Appl. No. 13/534,555, filed Jun. 27, 2012.
Florian, Alt et al., Location-based Crowdsourcing:Extending Crowdsourcing to the Real World, Oct. 2010, Proceedings NordiCHI Oct. 16-20, 2010, pp. 13-22.
Final Rejection dated Nov. 7, 2014, U.S. Appl. No. 13/658,490, filed Oct. 23, 2012.
Pre-Interview First Office Action dated Mar. 18, 2014, U.S. Appl. No. 13/658,490, filed Oct. 23, 2012.
Final Rejection, dated Jun. 4, 2015, U.S. Appl. No. 13/219,835, filed Aug. 29, 2011.
Final Rejection dated May 12, 2015 for U.S. Appl. No. 13/542,379, filed Jul. 5, 2012.
Non-Final Rejection dated Oct. 3, 2014, U.S. Appl. No. 13/542,379, filed Jul. 5, 2012.
First Action Interview Office Action dated Jul. 24, 2014, U.S. Appl. No. 13/658,490, filed Oct. 23, 2012.

\* cited by examiner

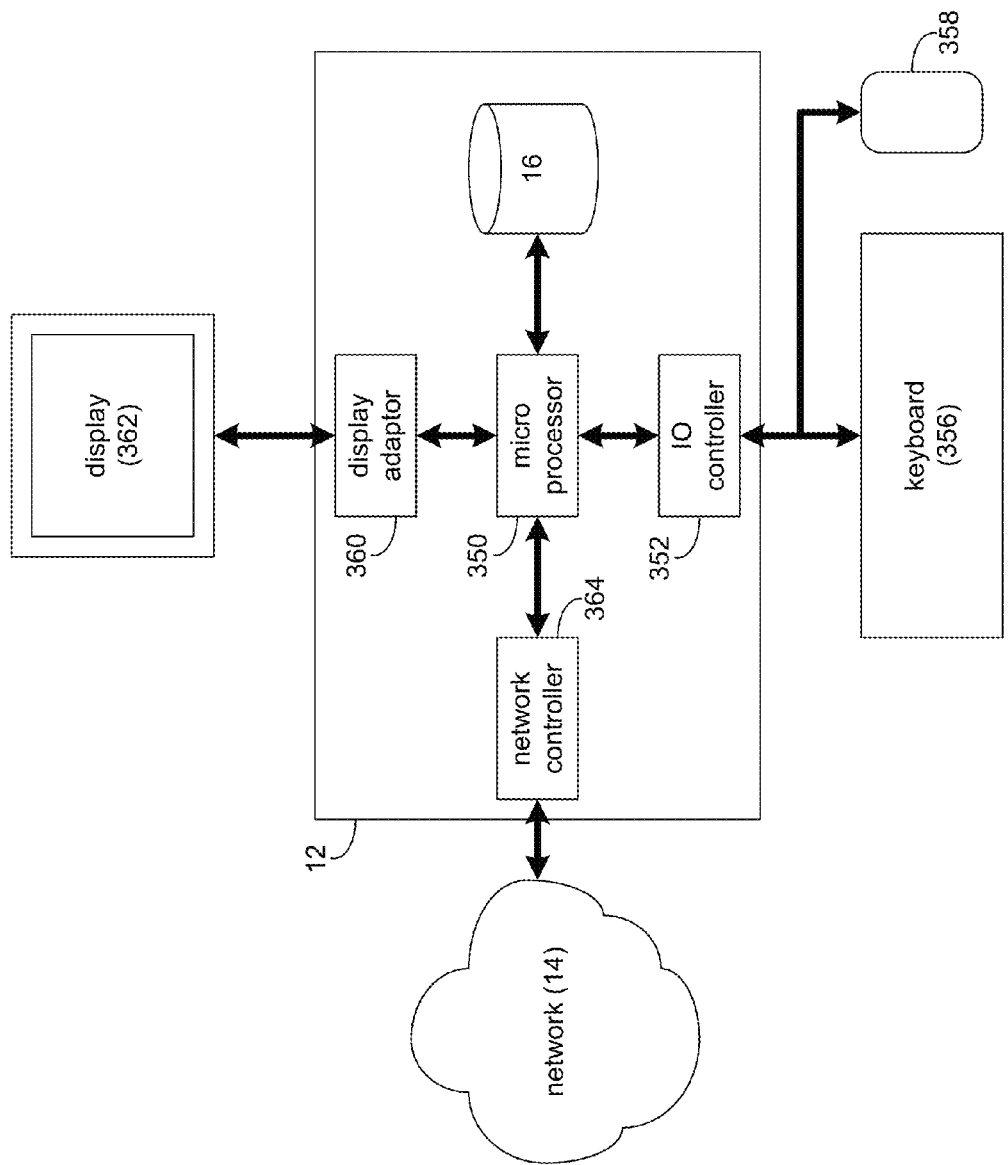

SYSTEM AND METHOD FOR EVENT CONTENT STREAM

TECHNICAL FIELD

This disclosure relates to online collaboration and, more particularly, to sharing content.

BACKGROUND

The Internet currently allows for the free exchange of ideas and information in a manner that was unimaginable only a couple of decades ago. One such use for the Internet is as a communication medium, whether it is via one-on-one exchanges or multi-party exchanges. For example, two individuals may exchange private emails with each other. Alternatively, multiple people may participate on a public website in which they may post entries that are published for multiple people to read. Examples of such websites may include but are not limited to product/service review sites, social networks, and topical blogs.

SUMMARY OF DISCLOSURE

According to an implementation, a method may include defining an online collaborative space associated with an event. The method may also include associating a plurality of event participants with the event. The method may also include receiving content contributions from one or more of the event participants. One or more of the content contributions may include one or more of video content and photographic content. The method may further include transmitting, to a client event application, an event content update notification in response to receiving at least one of the content contributions.

According to another implementation, a method may include defining an online collaborative space associated with an event. The method may also include associating a plurality of event participants with the event. The method may also include receiving content contributions from one or more of the event participants. The method may also include transmitting an event content update to a client event application based on the received content contributions to provide a live stream of event content.

One or more of the following features may be included. One or more of the content contributions may include media content associated with the event. The media content may include one or more of video content and photographic content. One or more of the content contributions may include metadata content associated with the event. The metadata content may include one or more tags associated with one or more pieces of event content.

The method may also include receiving a polling request for the event content update from the client event application. The method may further include identifying one or more received content contributions since a prior polling request from the client event application. The method may further include identifying one or more received content contributions within a prior polling time period.

The method may also include transmitting a notification of the event content update to the client event application responsive to receiving at least a first content contribution from one of the plurality of event participants. The method may further include receiving an update request from the client event application responsive to receiving the notification, and transmitting the event content update responsive to the update request.

According to another implementation, a computing system includes one or more processors. The one or more processors may be configured to define an online collaborative space associated with an event. The one or more processors may also be configured to associate a plurality of event participants with the event. The one or more processors may also be configured to receive content contributions from one or more of the event participants. The one or more processors may further be configured to transmit a notification of an event content update to a client event application based on the received content contributions from the plurality of the event participants.

One or more of the following features may be included. One or more of the content contributions may include media content associated with the event. The media content may include one or more of video content and photographic content. One or more of the content contributions may include metadata content associated with the event. The metadata content may include one or more tags associated with one or more pieces of event content.

The one or more processors may be further configured to receive an update request from the client event application responsive to transmission of the notification. The one or more processors may be further configured to transmit an event content update to a client event application based on the received content contributions to provide a live stream of event content.

The details of one or more implementations are set forth in the accompanying drawings and the description below. Other features and advantages will become apparent from the description, the drawings, and the claims.

BRIEF DESCRIPTION OF THE DRAWINGS

FIG. 4 is a diagrammatic view of the computing device of FIG. 1, according to an embodiment of the present disclosure.

Like reference symbols in the various drawings indicate like elements.

DETAILED DESCRIPTION OF EXAMPLE EMBODIMENTS

According to some example embodiments consistent with the present disclosure, an online space may be provided for an event. The online space may include, for example, one or more web pages or accounts that may, for example, be standalone web pages or accounts or may be provided within a social network website. The online space may enable information regarding the event to be published and/or shared among participants of the event and/or with other users. In some embodiments, information regarding the event may be uploaded by participants in the event and also shared with others via the online space in a generally contemporaneous manner. In various embodiments, the information regarding the event may include, for example, video, photos, or other content.

Figure 1:
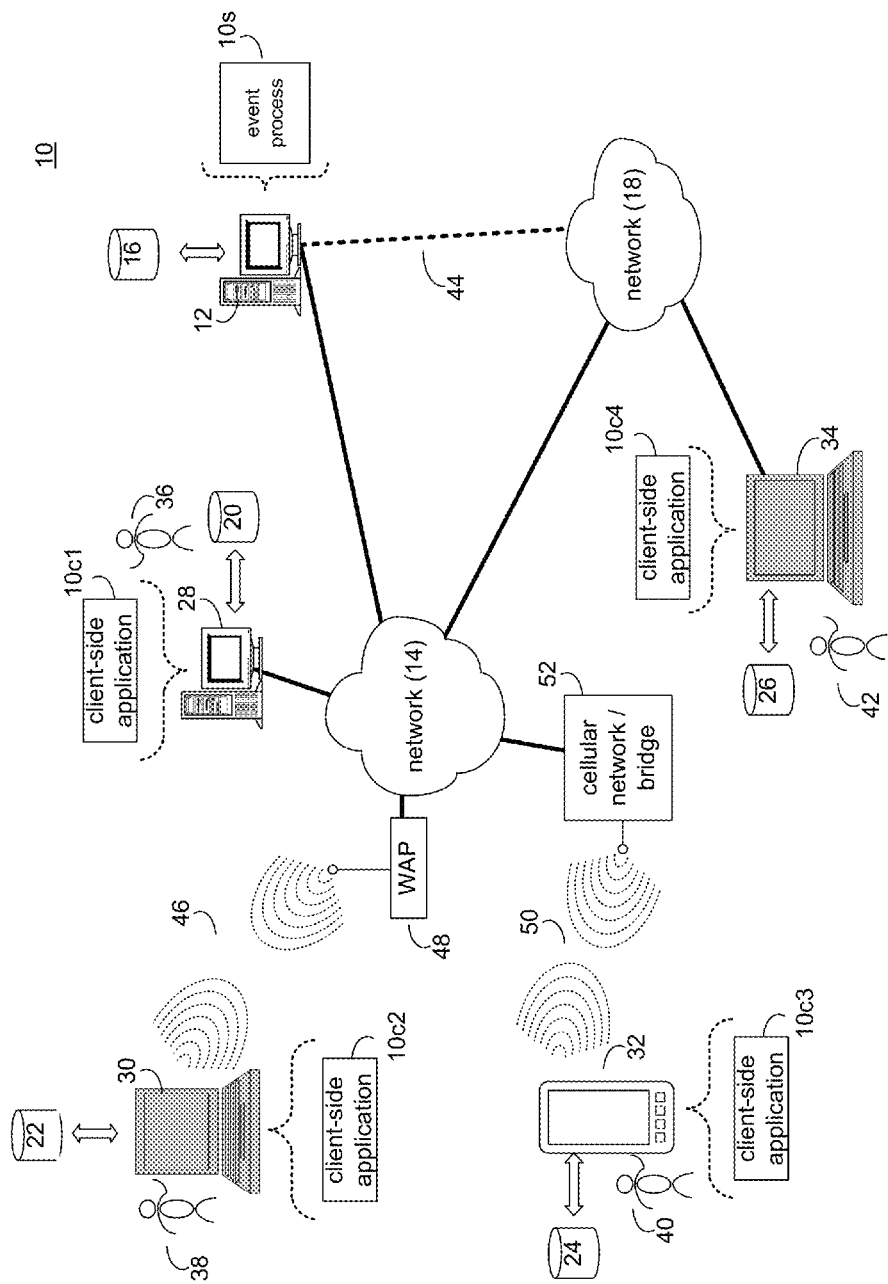
FIG. 1 is a diagrammatic view of a distributed computing network including a computing device that executes an event process according to an embodiment of the present disclosure.

Referring to FIG. 1, there is shown event process 10. For the following discussion, it is intended to be understood that event process 10 may be implemented in a variety of ways. For example, event process 10 may be implemented as a server-side process, a client-side process, or a server-side/client-side process.

For example, event process 10 may be implemented as a purely server-side process via event process 10s. Alternatively, event process 10 may be implemented as a purely client-side process via one or more of client-side application 10c1, client-side application 10c2, client-side application 10c3, and client-side application 10c4. Alternatively still, event process 10 may be implemented as a server-side/client-side process via event process 10s in combination with one or more of client-side application 10c1, client-side application 10c2, client-side application 10c3, and client-side application 10c4. In such an example, at least a portion of the functionality of event process 10 may be performed by event process 10s and at least a portion of the functionality of event process 10 may be performed by one or more of client-side application 10c1, 10c2, 10c3, and 10c3.

Accordingly, event process 10 as used in this disclosure may include any combination of event process 10s, client-side application 10c1, client-side application 10c2, client-side application 10c3, and client-side application 10c4.

Figure 2:
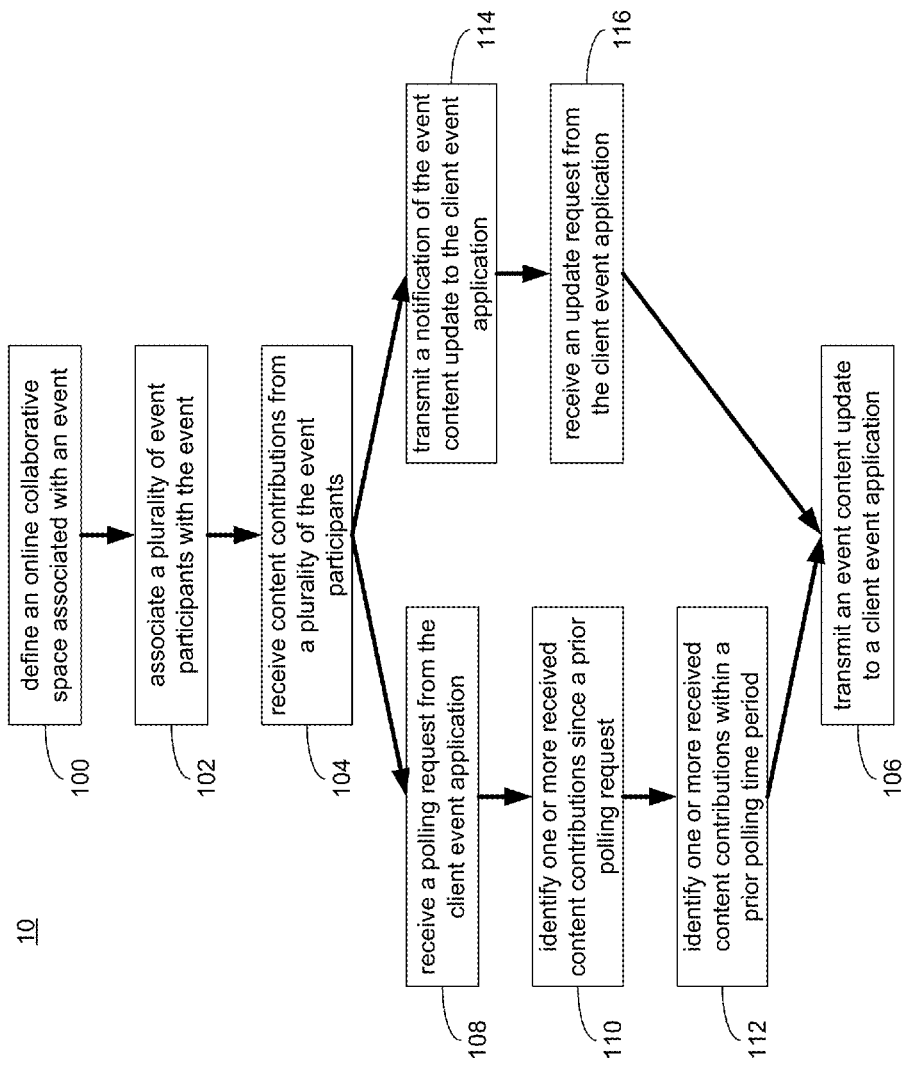
FIG. 2 is a flowchart of the event process of FIG. 1, according to an embodiment of the present disclosure.

Referring also to FIG. 2 and as will be discussed below in greater detail, event process 10 may define 100 an online collaborative space associated with an event. Event process 10 may also associate 102 a plurality of event participants with the event. Content contributions may be received 104 from one or more of the event participants. Event process 10 may also transmit 106 an event content update to a client event application based on the received 104 content contributions to provide a live stream of event content.

Event process 10s may be a server application and may reside on and may be executed by computing device 12, which may be connected to network 14 (e.g., the Internet or a local area network). Examples of computing device 12 may include, but are not limited to: a personal computer, a server computer, a series of server computers, a mini computer, a mainframe computer, or a dedicated network device.

The instruction sets and subroutines of event process 10s, which may be stored on storage device 16 coupled to computing device 12, may be executed by one or more processors (not shown) and one or more memory architectures (not shown) included within computing device 12. Examples of storage device 16 may include but are not limited to: a hard disk drive; a tape drive; an optical drive; a RAID device; an NAS device, a Storage Area Network, a random access memory (RAM); a read-only memory (ROM); and all forms of flash memory storage devices.

Network 14 may be connected to one or more secondary networks (e.g., network 18), examples of which may include but are not limited to: a local area network; a wide area network; or an intranet, for example.

Examples of client-side applications 10c1, 10c2, 10c3, 10c4 may include but are not limited to a web browser, a game console user interface, a television user interface, or a specialized application (e.g., an application running on a mobile platform). The instruction sets and subroutines of client-side application 10c1, 10c2, 10c3, 10c4, which may be stored on storage devices 20, 22, 24, 26 (respectively) coupled to client electronic devices 28, 30, 32, 34 (respectively), may be executed by one or more processors (not shown) and one or more memory architectures (not shown) incorporated into client electronic devices 28, 30, 32, 34 (respectively). Examples of storage devices 20, 22, 24, 26 may include but are not limited to: hard disk drives; tape drives; optical drives; RAID devices; random access memories (RAM); read-only memories (ROM), and all forms of flash memory storage devices.

Examples of client electronic devices 28, 30, 32, 34 may include, but are not limited to, data-enabled, cellular telephone 28, laptop computer 30, personal digital assistant 32, personal computer 34, a notebook computer (not shown), a server computer (not shown), a gaming console (not shown), a data-enabled television console (not shown), and a dedicated network device (not shown). Client electronic devices 28, 30, 32, 34 may each execute an operating system.

Users 36, 38, 40, 42 may access event process 10 directly through network 14 or through secondary network 18. Further, event process 10 may be accessed through secondary network 18 via link line 44.

The various client electronic devices (e.g., client electronic devices 28, 30, 32, 34) may be directly or indirectly coupled to network 14 (or network 18). For example, data-enabled, cellular telephone 28 and laptop computer 30 are shown wirelessly coupled to network 14 via wireless communication channels 46, 48 (respectively) established between data-enabled, cellular telephone 28, laptop computer 30 (respectively) and cellular network/bridge 50, which is shown directly coupled to network 14. Further, personal digital assistant 32 is shown wirelessly coupled to network 14 via wireless communication channel 52 established between personal digital assistant 32 and wireless access point (i.e., WAP) 54, which is shown directly coupled to network 14. WAP 54 may be, for example, an IEEE 802.11a, 802.11b, 802.11g, 802.11n, Wi-Fi, and/or Bluetooth device that is capable of establishing wireless communication channel 52 between personal digital assistant 32 and WAP 54. Additionally, personal computer 34 is shown directly coupled to network 18 via a hardwired network connection.

As generally discussed above, event process 10 may define 100 an online collaborative space associated with an event. For example, in an embodiment, a user (e.g., user 36) may access event process 10s (e.g., using client-side application 10c1, or another application) and may request that an event be created. The event may include, for example, a planned gathering or activity, such as a party, meeting, or the like, by which various individuals may plan to come together at a common place and time. In other embodiments, the event may include a common purpose or subject, but not necessarily a common time and/or place. For example, the event may include an opening of a movie. In such an embodiment, individuals may attend openings of the movie at different times and different locations (e.g., different theaters, cities, etc.). Various additional/alternative events may similarly be created.

In response to receiving the request to create an event, event process 10 may define 100 an online collaborative space associated with the event. The online collaborative space may include, for example, one or more web pages (e.g., which may be stand-alone web pages and/or may include one or more web pages within a social networking website), an event wall (e.g., which may be associated with one or more web pages within a social networking web site), an account (e.g., an account of an online space such as a social networking web site or other collaborative online space). The online collaborative space may include various additional/alternative online spaces that may be accessed by one or more users. In some embodiments, the user (e.g., user 36) may provide various attributes of the event, e.g., which event process 10 may associate with the event. For example, user 36 may provide a title or name identifying the event, as well other information identifying the event, such as a time and location of the event.

In some embodiments, event process 10 may define 100 the online collaborative space associated with the event, in which the various attributes provided by the user may also be associated with the event and/or with the online collaborative space.

Event process 10 may also associate 102 a plurality of event participants with the event. For example, in an embodiment, user 36 (e.g., the user who may initially create the event) may identify one or more individuals who are invited to the event. In such an embodiment, event process 10 may associate 102 the one or more individuals identified by user 36 as being event participants. In some embodiments, the associating 102 the one or more individuals with the event may include inviting the one or more individuals with the event. For example, in some embodiments, event process 10 may transmit an invitation to the one or more individuals (e.g., based on, at least in part, identifying information provided by user 36, such as an email address or social networking identifier associated with each of the one or more individuals). In some embodiments, the one or more individuals may be identified by user 36 based on, at least in part, membership of the one or more individuals in a defined group, such as membership in a social network group, participation in an online conversation (e.g., email conversation, contribution to comments within an online space, such as a social network page, a blog, or the like). Various additional and/or alternative groups may similarly be utilized for identifying the one or more individuals.

In addition/as an alternative to user 36 identifying individuals who are invited to the event, in some embodiments, one or more individuals initially invited by user 36 may be enabled to invite one or more additional individuals. In such an embodiment, event process 10 may associate such additional individuals with the event as also being event participants. Further, in some embodiments, the online collaborative space associated with the event may be accessible by individuals who have not been invited to, or otherwise associated with, the event. In some embodiments, such individuals may indicate an intent to join the event (e.g., by submitting an electronic request, such as selecting a joint option associated with the online collaborative space associated with the event). In response to an individual indicating an intent to join the event, event process 10 may associate 102 the individual with the event as an event participant.

Content contributions may be received 104 from one or more of the event participants. For example, event process 10 may allow one or more of the event participants associated with the event to upload content to the online collaborative space associated with the event. In some embodiments, a plurality of the event participants may upload content to the online collaborative space associated with the event. Further, in some embodiments, one or more of the event participants may upload content contributions during the event (e.g., during a time period for which the event was scheduled, as may have been input by a user as a property of the event when the event was created). In such an embodiment, event process 10 may receive one or more content contributions from one or more event participants while the event is ongoing. In various additional and/or embodiments, event participants may additionally and/or alternatively be enabled to upload content contributions before the scheduled time of the event and/or after the scheduled time of the event.

The content uploaded to the online collaborative space associated with the event may include content contributions to the online collaborative space associated with the event. The content contributions to the online collaborative space may be received 104 by event process 10. In some embodiments, one or more of the content contributions may include media content associated with the event. The media content may include, for example, one or more of video content, photographic content, audio content, and text content. Video content may include, for example, a video clip associated with the event (e.g., a video clip that may have been recorded at the event, etc.). Similarly, photographic content may include one or more photographs associated with the event (e.g., a photograph that may have been taken at the event). In various embodiments, the media content may further include audio content associated with the event (e.g., an audio clip that may have been recorded at the event) and/or text content associated with the event (e.g., a comment relating to the event and or relating to another content contribution). In various embodiments, the event participants may capture the media content and upload the media content using any suitable devices, such as a mobile computing device like a smartphone, tablet, or the like.

Figure 3:
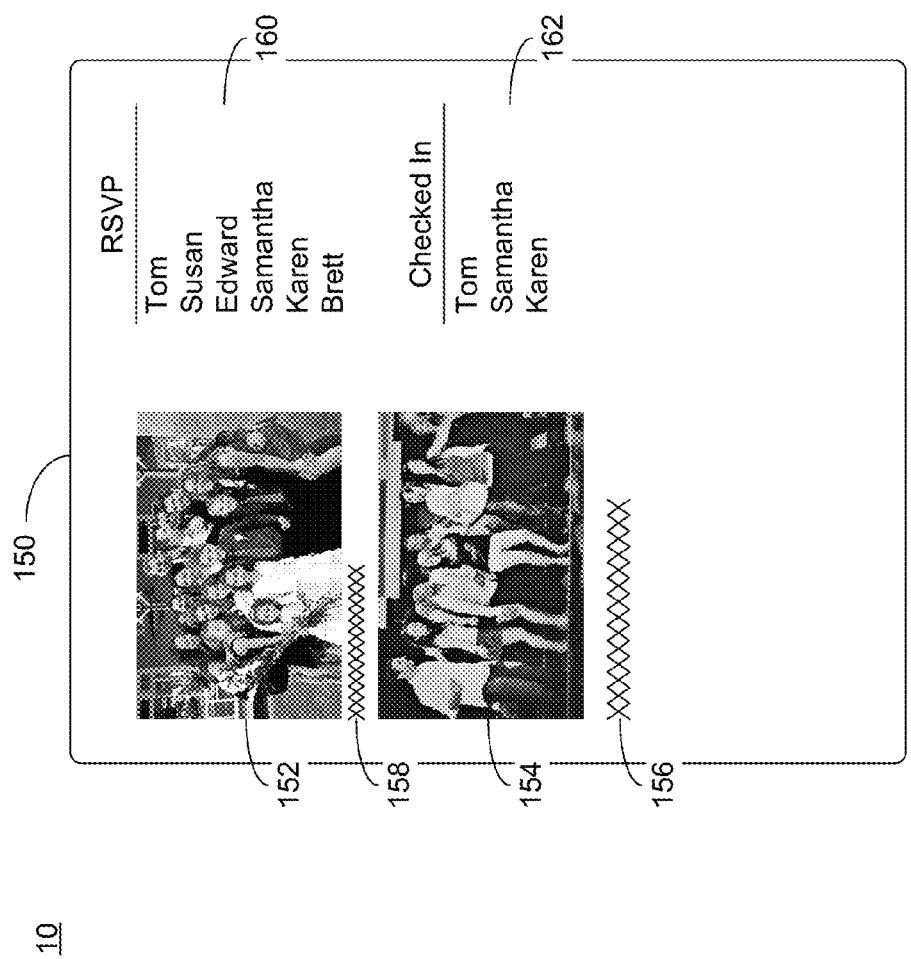
FIG. 3 is diagrammatic representation of a collaborative online space that may be defined, at least in part, by the event process of FIG. 1, according to an embodiment of the present disclosure.

For example, and referring to FIG. 3 a diagrammatic representation of the online collaborative space (e.g., event page 150) associated with the event. As shown, event page 150 may include one or more photographs (e.g., photos 152, 154) that may have been uploaded by one or more event participants. Additionally, event page 150 may include one or more comments (e.g., comment 156) that may have been created by, and uploaded by, an event participant. Event process 10 may receive 104 the content contributions (e.g., photos 152, 154, and comment 156) uploaded by the one or more event participants. Various additional and/or alternative content contributions may also be received by event process 10, e.g., as discussed above. In some embodiments, the content contributions may be arranged and/or indexed within event page 150 based on a time at which each content contribution is received 104 by event process and/or each content contribution may include an associated timestamp that may indicate a time at which each content contribution was received 104.

In some embodiments, the one or more of the content contributions may include metadata content associated with the event. For example, the metadata content may include one or more tags associated with one or more pieces of event content, metadata associated with one or more event participants (whether present at the event or not), such as RSVP status, event check-in status, or the like. For example, and referring still to FIG. 3, one or more metadata tags (e.g., tag 158) may be associated with a content contribution received 104 by event process 10. For example, tag 158 may identify one or more individuals included within photo 152, context information relating to photo 152, or the like. Tag 158 may be received 104 contemporaneously with photo 152 and/or subsequent to receipt 104 of photo 152. Further, tag 158 may be received 104 from the same event participant that uploaded photo 152 and/or may be received 104 from a different event participant. In a similar manner, one or more tags may be associated with other pieces of content (e.g., videos and other media) and/or with other data, such as users, locations, etc.

As another example, in an embodiment, event page 150 may include listing of event participants from whom an affirmative acknowledgment of an intent to participate in the event has been received (e.g., RSVP list 160). In an embodiment, when an affirmative acknowledgement of an intent to participate in the event is received from an event participant, metadata may be associated with the event participant indicating a positive RSVP status with the event participant. Similarly, event page 150 may include a listing of event participants that have indicated that they have arrived at the event and/or are otherwise actively participating in the event (e.g., Checked in listing 162). In an embodiment, when an indication of active participation in the event is received from an event participant, metadata may be associated with the event participant indicating a positive checked-in status. Various additional and/or alternative metadata may be received and/or associated with elements of event page 150, event participants, and/or other aspects of the event.

Event process 10 may also transmit 106 an event content update to a client event application based on the received 104 content contributions to provide a live stream of event content. In an example embodiment, the event content update may include any content contributions that have been received 104 by event process 10, but that have not already been transmitted 106 to the client event application. In an embodiment, event process 10 transmit 106 the event content update to the client event application to provide a live stream of event content. A live stream of the event content may include transmissions 106 of event content updates to the client event application to allow for receipt of the event content update by the client event application generally contemporaneously with the receipt 104 of the content contributions by event process 10 (e.g., with a relatively short time delay between the receipt 104 of the content contribution by event process 10 and transmission 106 of the event content update to the client event application). As such, a user associated with the client event application may receive the and view (e.g., via the client event application) the event content updates generally contemporaneously with capture and/or uploading of the content contributions. The client event application may include an application that a user may utilized to access the online collaborative space associated with the event. Examples of the client event application (e.g., which may include one or more of client-side applications 10c1, 10c2, 10c3, and 10c4 depicted in FIG. 1) may include, but are not limited to, a web browser application and/or a special purpose application. As also generally discussed above, at least a portion of the functionality of the event process may be performed by one or more of client-side applications 10c1, 10c2, 10c3, 10c4.

In an embodiment, the live stream of the event may be achieved based, at least in part, by periodic polling of the online collaborative space by the client event application. Consistent with such an embodiment, the client event application may periodically transmit a polling request for the event content update to event process 10. The polling request may be transmitted at any suitable time interval (e.g., depending upon design criteria and user preference) and, in some embodiments, may be variable depending upon various user and/or system settings. In various example embodiments, the polling time interval may include one second, five seconds, ten second, fifteen seconds, thirty seconds, one minute, or any other suitable polling time interval.

Event process 10 may receive 108 the polling request for the event content update from the client event application. Further, in response to receiving 108 the polling request for the event content update from the client, event process 10 may identify 110 one or more received 104 content contributions since a prior polling request from the client event application. For example, event process 10 may determine a last time that a polling request was received from the client event application. In some embodiments, determining the last time that a polling request was received from the client event application may be based on, at least in part, an identifier associated with the client event application, a user credential (e.g., a user name, password, or the like) utilized to access the online collaborative space associated with the event, or other identifier that may be used to identify one or more of the client event application and/or the user utilizing the client event application. Further, event process 10 may identify 110 one or more content contributions that have been received 104 since a prior polling request was received by the client event application. In some embodiments, content contributions received 104 since the last polling request by the client event application may be identified 110 based on, at least in part, a timestamp associated with the content contribution (e.g., which may indicate a time at which the content contribution was received 104 by event process 10). The identified 110 one or more content contributions received 104 since the prior polling request by the client event application may be the event content update. Upon identifying 110 the one or more content contributions, event process 10 may transmit 106 the event content update to the client event application.

In some embodiment, event process 10 may identify 112 one or more received content contributions within a prior polling time period. For example, in addition and/or as an alternative to determining a prior polling request received from the specific client event application, event process 10 may determine a polling time interval based on system and/or user settings. In some embodiments, when a client event application initially accesses the online collaborative space associated with the event, the client event application may initially download all available content contributions (e.g., all content contributions that have been received 104 as of the time the online collaborative space is accessed). Subsequently, the client event application may transmit a polling request at a polling time interval. In an example embodiment, in which the polling time interval may be thirty seconds, event process 10 may identify 112 one or more content contributions that may have been received 104 within the last thirty seconds (e.g., within the prior polling time period). Event process 10 may identify 112 the one or more content contributions as having been received 104 within the prior polling time period based on, at least in part, a timestamp associated with the content contribution (e.g., which may indicate a time at which the content contribution was received 104 by event process 10). The identified 112 one or more content contributions that may have been received 104 within the prior polling time period may be the event content update. Upon identifying 112 the one or more content contributions, event process 10 may transmit 106 the event content update to the client event application.

In an embodiment, event process 10 may notify a client event application that new content has been received 104, and that the content may be available for download by the client event application. For example, in an embodiment event process 10 may transmit 114 a notification of the event content update to the client event application responsive to receiving 104 at least a first content contribution from one of the plurality of event participants. As generally described above, the event content update may include a content contribution that has not been transmitted to the client event application. In an example embodiment, event process 10 may receive 116 an update request from the client event application responsive to the client event application receiving the transmitted 114 notification. The update request 116 from the client event application may include a request that the event content update be transmitted to the client event application. Event process 10 may further transmit 106 the event content update responsive to the update request from the client event application.

In an embodiment, event process 10 may transmit 106 an event content update to a client event application in response to receiving 104 new event content. For example, and as generally described above, an event participant may upload a content contribution, which may be received 104 by event process 10. Upon receiving 104 the event content contribution from the event participant, event process 10 may transmit 106 an event content update to a client event application, in which the event content update may include the content contribution that was received 104 from the event participant. Consistent with such an embodiment, event process 10 may generally provide the live stream of event content as push content updates.

Referring also to FIG. 4, there is shown a diagrammatic view of computing system 12. While computing system 12 is shown in this figure, this is for illustrative purposes only and is not intended to be a limitation of this disclosure, as other configuration are possible. For example, any computing device capable of executing, in whole or in part, event process 10 may be substituted for computing device 12 within FIG. 4, examples of which may include but are not limited to client electronic devices 28, 30, 32, 34.

Computing system 12 may include microprocessor 350 configured to e.g., process data and execute instructions/code for event process 10. Microprocessor 350 may be coupled to storage device 16. As discussed above, examples of storage device 16 may include but are not limited to: a hard disk drive; a tape drive; an optical drive; a RAID device; an NAS device, a Storage Area Network, a random access memory (RAM); a read-only memory (ROM); and all forms of flash memory storage devices. IO controller 352 may be configured to couple microprocessor 350 with various devices, such as keyboard 354, mouse 356, USB ports (not shown), and printer ports (not shown). Display adaptor 360 may be configured to couple display 362 (e.g., a CRT or LCD monitor) with microprocessor 350, while network adapter 364 (e.g., an Ethernet adapter) may be configured to couple microprocessor 350 to network 14 (e.g., the Internet or a local area network).

As will be appreciated by one skilled in the art, the present disclosure may be embodied as a method (e.g., executing in whole or in part on computing device 12), a system (e.g., computing device 12), or a computer program product (e.g., encoded within storage device 16). Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium (e.g., storage device 16) having computer-usable program code embodied in the medium.

Any suitable computer usable or computer readable medium (e.g., storage device 16) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor (e.g., processor 350) of a general purpose computer/special purpose computer/other programmable data processing apparatus (e.g., computing device 12), such that the instructions, which execute via the processor (e.g., processor 350) of the computer or other programmable data processing apparatus, create means for implementing the functions/acts specified in the flowchart and/or block diagram block or blocks.

These computer program instructions may also be stored in a computer-readable memory (e.g., storage device 16) that may direct a computer (e.g., computing device 12) or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer (e.g., computing device 12) or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

Having thus described the disclosure of the present application in detail and by reference to embodiments thereof, it will be apparent that modifications and variations are possible without departing from the scope of the disclosure defined in the appended claims.

What is claimed is:

1. A computer-implemented method comprising:
    defining, on one or more processors, an online collaborative space on a social networking site associated with an event, the event having an associated name and location;
    associating, on the one or more processors, a plurality of event participants with the event and the online collaborative space;
    receiving, on the one or more processors, content contributions to the online collaborative space from one or more of the event participants, one or more of the content contributions including one or more of video content and photographic content; and
    transmitting, on the one or more processors, to a client event application, an event content update notification in response to receiving at least one of the content contributions to the online collaborative space to provide thereby a live stream of event content, wherein an event process on the one or more processors identifies content contributions received after a previous event content update was transmitted.

2. A computer-implemented method comprising:
    defining, on one or more processors, an online collaborative space on a social networking site associated with an event, the event having an associated location;
    associating, on the one or more processors, a plurality of event participants with the event and the online collaborative space;
    receiving, on the one or more processors, content contributions to the online collaborative space from one or more of the event participants; and
    periodically transmitting, on the one or more processors, an event content update to a client event application based on the received content contributions to the online collaborative space to provide thereby a live stream of event content, wherein an event process on the one or more processors identifies content contributions received after a previous event content update was transmitted.

3. The computer-implemented method of claim 2, wherein one or more of the content contributions include media content associated with the event.

4. The computer-implemented method of claim 3, wherein the media content includes one or more of video content and photographic content.

5. The computer-implemented method of claim 2, wherein one or more of the content contributions include metadata content associated with the event.

6. The computer-implemented method of claim 5, wherein the metadata content includes one or more tags associated with one or more pieces of event content.

7. The computer-implemented method of claim 2, further comprising transmitting a notification of the event content update to the client event application responsive to receiving at least a first content contribution from one of the plurality of event participants.

8. The computer-implemented method of claim 7, further comprising, receiving an update request from the client event application responsive to receiving the notification, and transmitting the event content update responsive to the update request.

9. A computing system comprising one or more processors, the one or more processors configured to:
    define an online collaborative space on a social networking site associated with an event, the event having an associated location;
    associate a plurality of event participants with the event and the online collaborative space;
    receive content contributions to the online collaborative space from one or more of the event participants; and
    periodically transmit an event content update to a client event application based on the received content contributions to the online collaborative space from the plurality of event participants to provide thereby a live stream of event content, wherein an event process identifies content contributions received after a previous event content update was transmitted.

10. The computing system of claim 9, wherein one or more of the content contributions include media content associated with the event.

11. The computing system of claim 10, wherein the media content includes one or more of video content and photographic content.

12. The computing system of claim 9, wherein one or more of the content contributions include metadata content associated with the event.

13. The computing system of claim 12, wherein the metadata content includes one or more tags associated with one or more pieces of event content.

14. The computing system of claim 9, wherein the one or more processors are further configured to receive an update request from the client event application responsive to transmission of an event content update notification.

15. The computing system of claim 14, wherein the one or more processors are further configured to transmit the event content update to the client event application in response to the update request.

16. The computer implemented method of claim 2, wherein the plurality of event participants are associated with the event and the online collaborative space based on membership in a social networking group.

17. The computer implemented method of claim 2, wherein the event also has an associated name and time.

18. The computer implemented method of claim 2, wherein the content contributions are received during the event.

19. The computing system of claim 9, wherein the plurality of event participants are associated with the event and the online collaborative space based on membership in a social networking group.

20. The computing system of claim 9, wherein the event also has an associated name and time.

\* \* \* \* \*